United States Patent
Chenglin

(10) Patent No.: US 6,734,402 B1
(45) Date of Patent: May 11, 2004

(54) PORTABLE AND DISENGAGEABLE COOKING DEVICE

(76) Inventor: Yueh-Kung Chenglin, No. 643, Sec. 1, Hsi Men Road, Tainan (TW), 702

(*) Notice: Subject to any disclaimer, the term of this patent is extended or adjusted under 35 U.S.C. 154(b) by 0 days.

(21) Appl. No.: 10/397,895

(22) Filed: Mar. 26, 2003

(51) Int. Cl.[7] .............................. F24C 1/16; F24C 3/14; F24C 7/10; A47J 36/34
(52) U.S. Cl. ................... 219/433; 219/386; 219/443.1; 219/451.1; 219/455.11; 219/432; 99/339; 126/9 R
(58) Field of Search ................................ 219/386, 432, 219/433, 443.1, 451.1, 455.11; 126/9 R, 9 B, 261, 262, 265, 266; 99/339, 340

(56) References Cited

U.S. PATENT DOCUMENTS

| | | | |
|---|---|---|---|
| 4,046,132 A | * | 9/1977 | White .......................... 126/9 R |
| 4,399,351 A | * | 8/1983 | Koff ............................. 219/433 |
| 4,776,318 A | * | 10/1988 | Serra et al. .................. 126/9 R |
| 6,089,145 A | * | 7/2000 | Watson ........................ 99/339 |
| 6,129,078 A | * | 10/2000 | Moulder ...................... 126/9 R |
| 6,223,738 B1 | * | 5/2001 | Wu .............................. 126/9 R |

FOREIGN PATENT DOCUMENTS

WO    WO9418504    *    8/1994

* cited by examiner

*Primary Examiner*—Joseph Pelham
(74) *Attorney, Agent, or Firm*—Charles E. Baxley

(57) ABSTRACT

A cooking device includes two casings each having an inner portion, and a shelf disposed in the middle portion. A heating device is disposed and supported on the inner portions of the casings, and may either be the electrical heating members, or gas stoves, or furnaces, etc. The casings and the heating device may be assembled by the users when required, and may be disengaged from each other for allowing the cooking device to be easily stored and packaged. The casings each may include a chamber to receive boiled fluid material.

5 Claims, 3 Drawing Sheets

PORTABLE AND DISENGAGEABLE COOKING DEVICE

BACKGROUND OF THE INVENTION

1. Field of the Invention

The present invention relates to a cooking device, and more particularly to a cooking device including a number of parts or elements to be disengage able from each other and to be assembled together when required.

2. Description of the Prior Art

Various kinds of typical cooking devices have been developed and comprise electrical heating or cooking devices, gas stoves, or the like. Normally, the typical cooking devices comprise a solid one-integral piece having a number of parts or elements that may not be separated or dismantled from each other, such that the typical cooking devices normally comprise a large volume that is not good for both storing and transportation purposes.

In addition, while boiling, the fluid or the like may flow out of the container that contains the food or the like to be cooked. However, the typical cooking devices have no containers to receive the fluid or the like that may flow out of the container. For electrical furnaces or stoves, the fluid that flows out of the container may shortage the electrical heating elements or members of the electrical furnaces or stoves, and may even cause disasters.

The present invention has arisen to mitigate and/or obviate the afore-described disadvantages of the conventional cooking devices.

SUMMARY OF THE INVENTION

The primary objective of the present invention is to provide a cooking device including a number of parts or elements to be disengage able from each other and to be assembled together when required.

In accordance with one aspect of the invention, there is provided a cooking device comprising two casings each including an inner portion and an outer portion, and a middle portion provided and defined between the inner portion and the outer portion thereof. The casings each may include a shelf provided on the middle portion thereof, and a heating device disposed and supported on the inner portions of the casings. The heating device may be the electrical heating members, or gas stoves, or furnaces, etc. The casings and the heating device may be assembled by the users when required, and may be disengaged from each other for allowing the cooking device to be easily stored and packaged.

The casings each include a chamber formed therein to receive fluid material that may be generated while the food or water is boiled and that may flow out of the container while boiling. The shelves of the casings each include a curved inner peripheral surface formed therein and spaced away from the outer peripheral portion of the heating device, for allowing the fluid flowing out of the container to be received within the chambers of the casings.

The casings each include a wall member extended upwardly from the shelf respectively, and a panel extended laterally from the wall member. The casings each include a space formed in the outer portion thereof, to form a carrying portion.

Further objectives and advantages of the present invention will become apparent from a careful reading of the detailed description provided herein below, with appropriate reference to the accompanying drawings.

DETAILED DESCRIPTION OF THE PREFERRED EMBODIMENT

Figure 1:
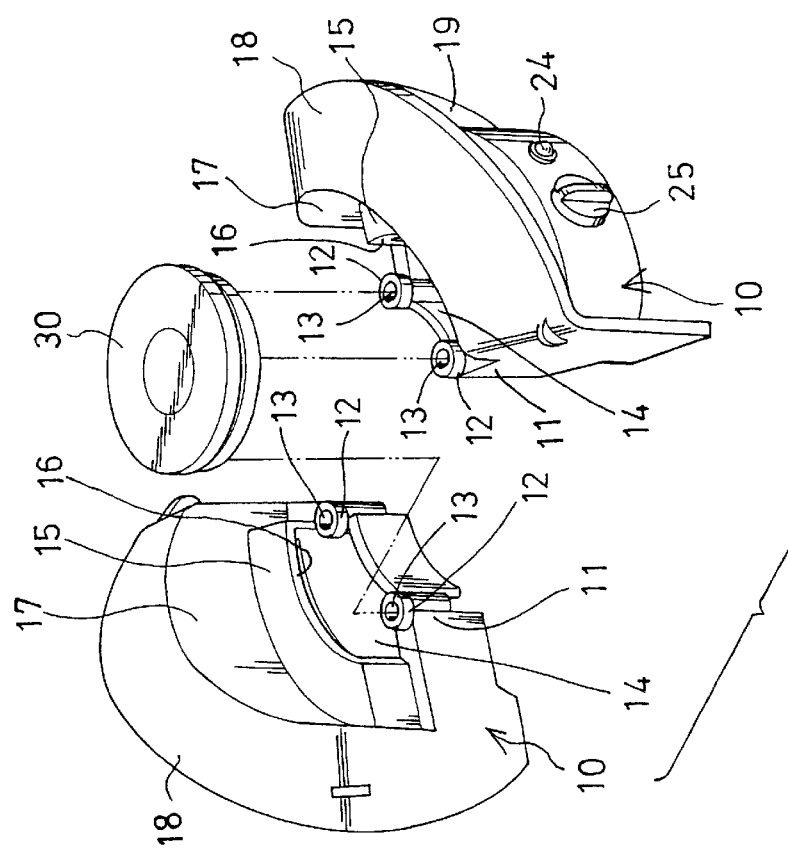
FIG. 1 is an exploded view of a cooking device in accordance with the present invention.
Figure 3:
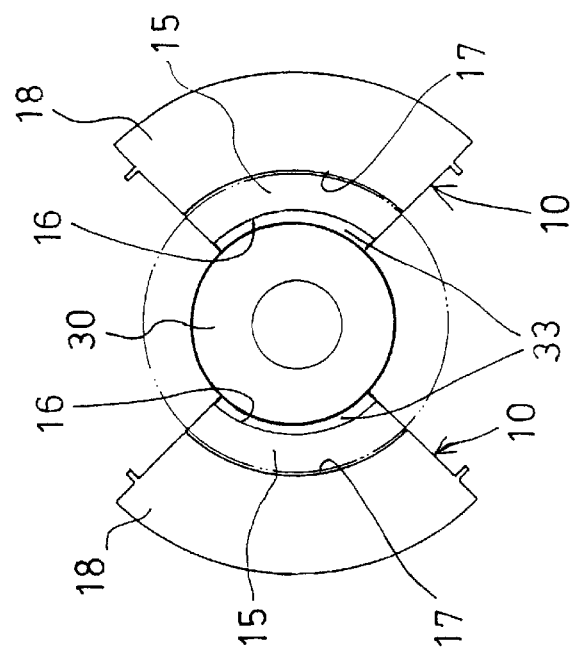
FIG. 3 is an upper plan view of the cooking device.
Figure 2:
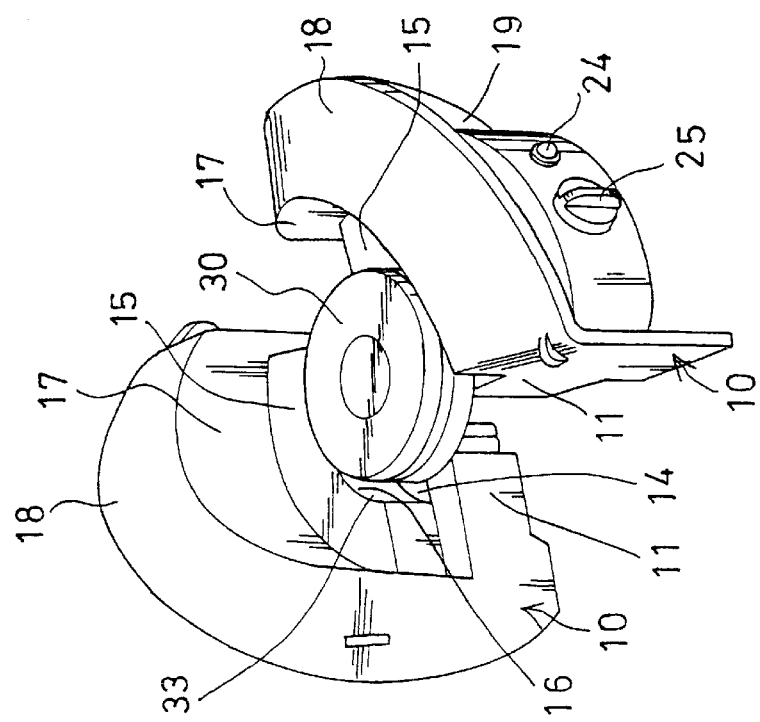
FIG. 2 is a perspective view of the cooking device.

Referring to the drawings, and initially to FIGS. 1–3, a cooking device in accordance with the present invention comprises two casings 10 each including an inner portion 11 having one or more, such as two hubs 12 provided therein. The hubs 12 each may include an orifice 13 formed therein. The casings 10 each may include a chamber 14 formed therein to receive the fluid or the like which may flow out of the container that contains the food or the like to be cooked.

The casings 10 each may include an elevated shelf 15 formed or provided on the middle portion that is defined between the inner portion 11 and an outer portion of the respective casing 10. The casings 10 each may include a curved inner peripheral surface 16 formed in the respective shelves 15, and may include a curved wall member 17 extended upwardly from the outer peripheral portion of the shelf 15, and a panel 18 extended laterally and outwardly from the upper portion of the wall member 17.

The casings 10 each may include a cavity or space 19 formed in the outer portion thereof, for allowing the panel 18 to be formed as a handle or carrying portion with which the casings 10 may be easily carried and moved. The casings 10 each may further include an indicating or displaying member 24, to indicate or display the operation of the cooking device, and may further include a timer or control device 25 to control the operation of the cooking device.

A heating device 30 is disposed between the casings 10, or the heating device 30 may include one or more projections (not shown) extended there from and engaged into the orifices 13 of the hubs 12 of the casings 10, and/or may be secured to the casings 10 with fasteners, adhesive materials, catches, or by welding processes. The control device 25 may be electrically coupled to the heating device 30 with such as electric wires, in order to control the heating device 30.

The heating device 30 may be the typical electrical heating members, or gas stoves, or furnaces, etc. and may include an outer peripheral surface or contour corresponding to the inner peripheral surfaces 16 of the casings 10, for allowing the heating device 30 to be received between the inner peripheral surfaces 16 of the casings 10.

Figure 4:
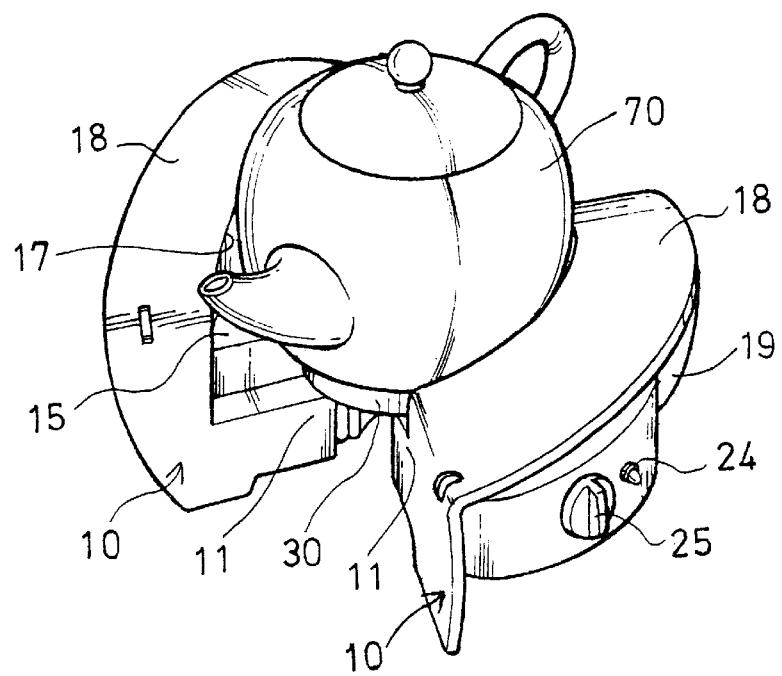
FIGS. 4 and 5 are perspective views illustrating the operation of the cooking device.
Figure 5:
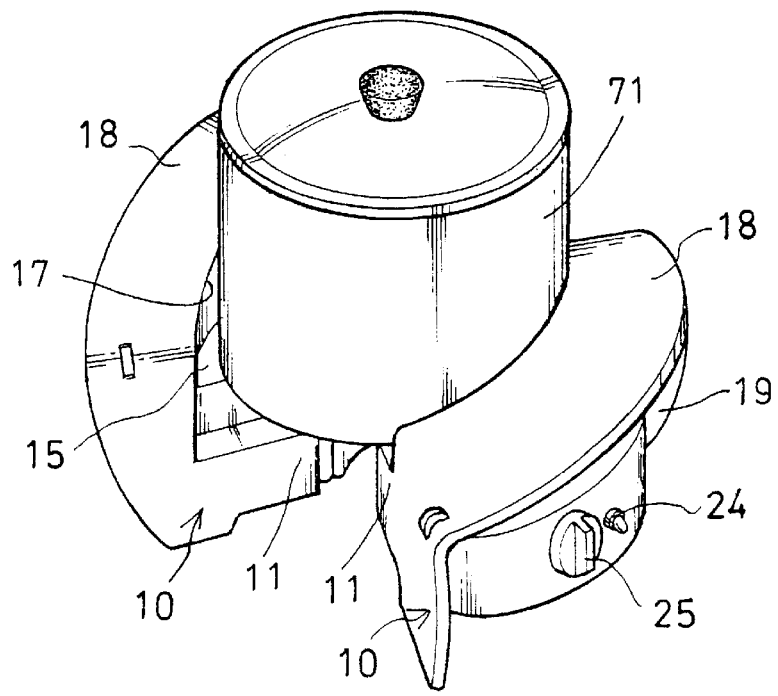

In operation, as shown in FIGS. 4 and 5, the container 70, 71 such as the tea pot 70 as shown in FIG. 4, or the other cookers 71 as shown in FIG. 5, may be disposed and supported on the shelves 15 of the casing 10, for allowing the container 70, 71 to be heated by the heating device 30. The containers 70, 71 are provided to contain water or food or the like to be cooked.

As shown in FIG. 2, it is preferable that a gap or space 33 is formed between the inner peripheral surfaces 16 of the casings 10 and the heating device 30, or the inner peripheral surfaces 16 of the casings 10 is spaced away from the heating device 30, for allowing the fluid or the like that may flow out of the container to flow into the chambers 14 of the casings 10 via the spaces 33 that are formed between the inner peripheral surfaces 16 of the casings 10 and the heating device 30.

Accordingly, the cooking device in accordance with the present invention includes a number of parts or elements that may be disengaged from each other and that may be assembled together when required.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cooking device comprising:

two casings each including an inner portion and an outer portion, and a middle portion provided and defined between said inner portion and said outer portion thereof, said casings each including a shelf provided on said middle portion thereof, and a heating device disposed and supported on said inner portions of said casings.

2. The cooking device as claimed in claim 1, wherein said casings each include a chamber formed therein to receive fluid material.

3. The cooking device as claimed in claim 1, wherein said shelves of said casings each include a curved inner peripheral surface formed therein and spaced away from said outer peripheral portion of said heating device.

4. The cooking device as claimed in claim 1, wherein said casings each include a wall member extended upwardly from said shelf respectively, and a panel extended laterally from said wall member.

5. The cooking device as claimed in claim 4, wherein said casings each include a space formed in said outer portion thereof, to form a carrying portion.

* * * * *